United States Patent
Kinoshita

[11] 3,977,806
[45] Aug. 31, 1976

[54] DEVICE FOR MOUNTING ATTACHMENT ON HORIZONTAL BORING MACHINE

[75] Inventor: Toshiyuki Kinoshita, Hiroshima, Japan

[73] Assignee: Mitsubishi Jukogyo Kabushiki Kaisha, Japan

[22] Filed: June 4, 1975

[21] Appl. No.: 583,553

Related U.S. Application Data

[63] Continuation-in-part of Ser. No. 445,436, Feb. 25, 1974, abandoned, which is a continuation of Ser. No. 244,765, April 17, 1972, abandoned.

[30] Foreign Application Priority Data

Apr. 20, 1971  Japan.............................. 46-24959

[52] U.S. Cl.............................. 408/141; 408/234; 90/11 R; 192/67 R
[51] Int. Cl.².......................................... B23B 47/00
[58] Field of Search........... 408/126, 139, 141, 234, 408/9; 90/17, 19, 11 R, 11 A; 192/67 R, 17 R; 74/339

[56] References Cited
UNITED STATES PATENTS 1,499,084  6/1924  Sundstrand............................ 90/17
2,180,597  11/1939  Le Bus.............................. 192/67 R

*Primary Examiner*—Gil Weidenfeld
*Attorney, Agent, or Firm*—McGlew and Tuttle

[57] ABSTRACT

The attachment has a rotatable spindle and the horizontal boring machine has a headstock rotatably mounting an axially reciprocable headstock spindle. A dog clutch includes a first clutch member rotatable with the attachment spindle and a second clutch member rotatable with the headstock spindle. The attachment is arranged to be bolted to the headstock with the clutch members in axial alignment. Rotation of the headstock spindle is halted in a predetermined angular position, and the headstock spindle is advanced toward the attachment. A releasable member is operable to retain the first clutch member in an angular position in which its teeth are in correct meshing alignment with the teeth of the second clutch member for smooth interengagement of the clutch members responsive to the advance of the headstock spindle. An operating member is engaged by the attachment as it is bolted to the headstock and operates a control switch which initiates operation of electric and hydraulic control elements to disengage the releasable member from the first clutch member to provide for rotation thereof. The electrical and hydraulic control elements include an operator fixed on the headstock spindle and engageable with a microswitch operator as the headstock spindle is advanced, so that, in effect, as the attachment is bolted to the headstock of the horizontal boring machine, the dog clutch is automatically engaged.

4 Claims, 7 Drawing Figures

DEVICE FOR MOUNTING ATTACHMENT ON HORIZONTAL BORING MACHINE

CROSS-REFERENCE TO RELATED APPLICATIONS

This application is a continuation-in-part of application Ser. No. 445,436 filed Feb. 25, 1974, now abandoned, which, in turn, is a streamline continuation of application Ser. No. 244,765, filed Apr. 17, 1972, and now abandoned.

BACKGROUND OF THE INVENTION

The invention relates to a device for automatically connecting the headstock of a horizontal boring machine and an attachment arranged to be secured to the headstock for use on the boring machine.

In the conventional arrangement shown in FIG. 1, a right-angled head 2, serving as an example of attachments to a horizontal boring machine, is conventionally secured to the front face of the headstock of the boring machine and performs its function as its own spindle 3 is rotated. A known method of driving attachment spindle 3 is to advance the rotatable and axially displaceable built-in spindle 4 out of the headstock until a gear clutch member 5, provided at its front end, meshes with an internal gear 6 on attachment 2 so that rotation of spindle 4 is transmitted through bevel gears 7 and 8 to spindle 3.

The engagement of gear clutch member 5 on spindle 4 with internal ring gear 6 will be described in more detail hereinafter. The axial advance of spindle 4 usually is effected either automatically or by manual feeding, using a handwheel. In mounting an attachment of the character mentioned above on the boring machine, therefore, gear clutch member 5 of spindle 4 is manually moved into contact with the front face of internal gear 6. If the teeth of clutch member 5 just mesh with those of the internal gear or clutch member 6, then spindle 4 is advanced axially for full engagement between gears 5 and 6. More often than not, however, the respective phases of the tooth tips and roots of the two gears do not agree with each other. In such a case, the axially reciprocable spindle 4 is fed by hand until the teeth of gear clutch member 5 lightly contact those of internal gear 6. Then the operator carefully inches spindle 4 forwardly, by feel, while slowly rotating this spindle. In this manner, the operator senses the point where gear clutch member 5 meshes with internal gear 6, so that full engagement can now be accomplished.

From the foregoing, it will be clear that the conventional connection procedure requires and, in effect, depends on, the labor and skills of the operator. This offers increasing difficulties with larger, horizontal boring machines and with numerically-controlled machines, which are presently being introduced to a large extent.

SUMMARY OF THE INVENTION

In accordance with the present invention, a device for automatically mounting an attachment on the horizontal boring machine is provided and is free of the foregoing disadvantages and conventional devices. The device comprises a dog clutch operable to connect an axially reciprocable spindle in the headstock of the horizontal boring machine with a spindle rotatable in the attachment. The rotation of the headstock spindle is halted in a preset angular position by known mechanism installed therein, and the spindle is caused to move axially foward or to be advanced. Such a known mechanism is illustrated, for example, in U.S. Pat. No. 3,422,724, and more particularly described in column 8, lines 25–48 thereof. Means are provided to position the clutch member on the attachment in a predetermined angular relation such that it is assured that the intermeshing phases of the clutch members agree at all times. Additionally, means are provided to connect and disconnect the clutch member of the attachment automatically, by means of a releasable member engaging in a notch, this last-named means being electrically and hydraulically operated by means which automatically detect the mounting of the attachment on the headstock.

In accordance with the present invention, a gear or dog clutch member is secured to the front end of an axially reciprocable headstock spindle, and the rotation of the headstock spindle is halted in such a manner that the teeth of the gear clutch member are always stopped at a certain angular position, by taking advantage of the known fixed position stop motion, mentioned above, installed therein. The teeth of the other clutch member, on the attachment, and which is in the form of an internal ring gear, are adapted to mesh easily with the clutch member on the headstock spindle, as the second gear clutch member is also halted, at all times, at a predetermined angular orientation by a spring biased finger engageable in a notch in the dog clutch member of the attachment. The spring-pressed finger can be forced out of engagement with the internal ring gear by hydraulic piston means, which latter is reversely operable. As a result, the clutch member on the headstock spindle and the clutch member on the attachment are always so positioned that the teeth of one clutch member fit properly between the teeth of the other clutch member, with automatic axial advance of the headstock spindle providing positive meshing of the teeth. Once the intermeshing is completed, the headstock spindle is automatically halted. For the purpose of mounting an attachment, therefore, is it necessary only to connect it to the front face of the headstock, and the device then will proceed to complete the connection all by itself.

An object of the invention is to provide an improved device for connecting an attachment to the headstock of a horizontal boring machine.

Another object of the invention is to provide such a device in which, responsive to mounting of the attachment on an end face of the headstock, the device operates automatically to complete connection of the attachment spindle to the headstock spindle.

A further object of the invention is to provide such a device which is simple and rugged in operation, and which is relatively inexpensive.

For an understanding of the principles of the invention, reference is made to the following description of a typical embodiment thereof as illustrated in the accompanying drawings.

DESCRIPTION OF THE PREFERRED EMBODIMENT

Figure 2:
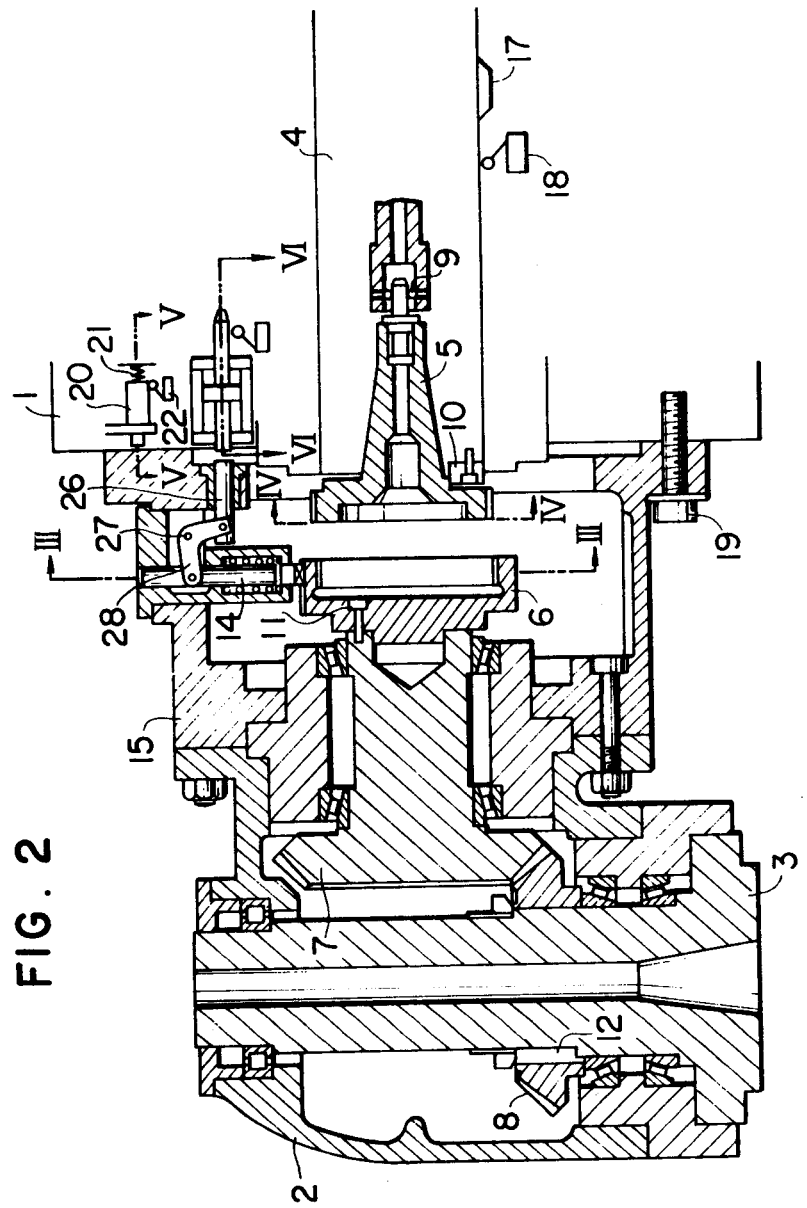
FIG. 2 is a view, similar to FIG. 1, illustrating a detail, in section, of an attachment mounted with a device embodying the invention.

Referring to FIG. 2, a right-angled head 2 again is shown as an example of attachments adapted to be connected to the front face of the headstock 1 of a horizontal boring machine. Head 2 performs its function as its own spindle 3 is rotated. For driving spindle 3, dependence is placed upon an axially reciprocable headstock spindle 4, which can rotate in headstock 1 and which can be advanced forwardly.

A gear or dog clutch member 5 is secured to the front end of spindle 4, and is fixed axially by a tool clamp 9. Rotation of spindle 4 is imparted to gear clutch member 5 through key 10. After clutch member 5 has been moved axially forwardly by spindle 4 into engagement with an internal gear or clutch member 6, rotation of spindle 4 is transmitted to a bevel gear 7 secured to gear 6 by bolts 11. Bevel gear 7 meshes with a bevel gear 8 secured to rotate with spindle 3 through the medium of a key 12 and, by the described drive, right-angle head 2 can function as an attachment on the boring machine.

Figure 1:
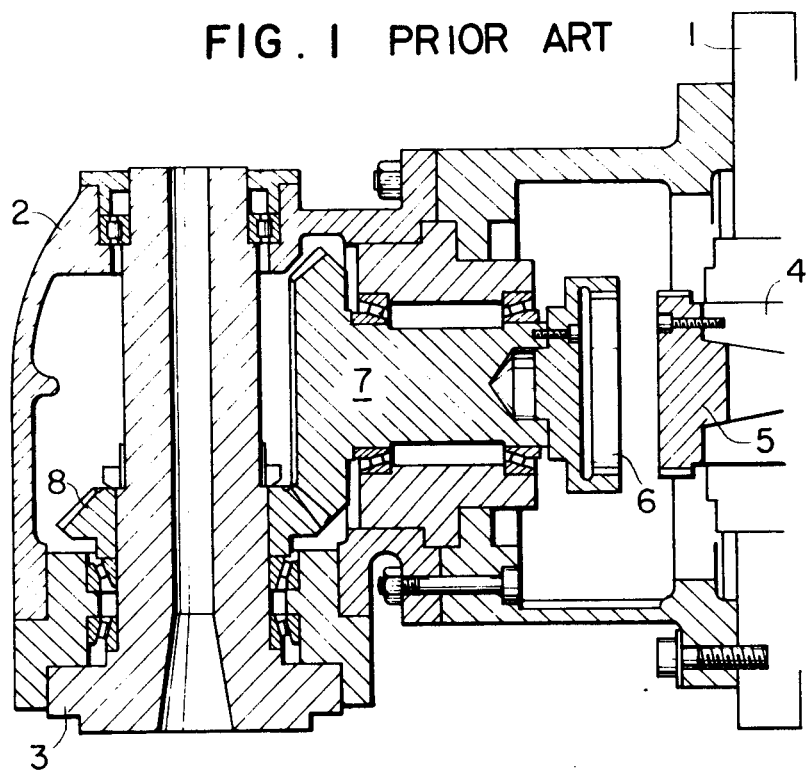
FIG. 1 is a detail, in section, of an attachment conventionally mounted on a horizontal boring machine.
Figure 3:
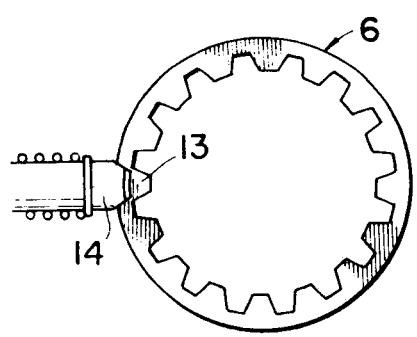
FIG. 3 is a sectional view taken along the line III—III of FIG. 2.

As illustrated in FIG. 3, the teeth 13 of internal gear 6 may be latched in a relative angular position by means of a retaining piece 14. As piece 14 is itself positioned by a support 15, shown in FIG. 2, internal gear or clutch member 6 is at all times releasably latched in a preset position with respect to support 15 through the releasable latch 14 shown in FIG. 3.

On the other hand, axially reciprocable spindle 4, shown in FIG. 2, is so designed that, after rotation, it is stopped always in a preset position by a known built-in fixed-position stop motion of headstock 1, such as that shown and described in the previously-mentioned U.S. Pat. No. 3,422,724.

Figure 4:
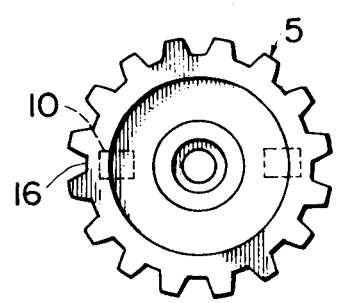
FIG. 4 is a sectional view taken along the line IV—IV of FIG. 2.

FIG. 4 illustrates spindle 4 as stopped by the stop motion, and also illustrates a tooth root 16 of gear clutch member 5 as aligned with key 10 of spindle 4. This positional relationship is maintained whenever spindle 4 is stopped by means of the known fixed-position stop motion, and the tooth roots 16 are thus maintained aligned with tooth crests 13 of internal gear 6 shown in FIG. 3.

If, therefore, the rotating spindle 4 of FIG. 2 is stopped and is then advanced axially, gear clutch member 5 and internal gear 6 will be positively engaged because their respective tooth phases are in complete agreement. In order to stop the axial advance of spindle 4 automatically in the position where interengagement of clutch members 5 and 6 is completely effected, a stop dog 17 is fixed to spindle 4 and a limit switch 18 is operable thereby to set up an electric circuit for automatically stopping advance of the spindle. This electric circuit is required only when the right-angle head 2 with a support 15 is mounted, as an attachment, on headstock 1. An arrangement for the circuitry and its operation will now be explained.

Figure 5:
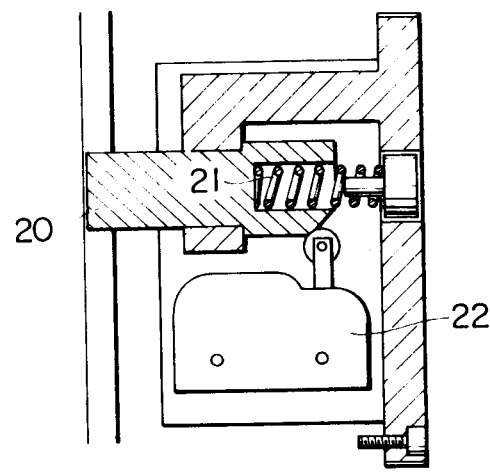
FIG. 5 is a sectional view taken along the lines V—V of FIG. 2.

When right-angled head 2 with support 15 is secured, as an attachment, to headstock 1 by bolts 19, a built-in rod 20 of the headstock is thereby forced inwardly, as shown in FIG. 5. Rod 20 compresses a spring 21 and closes a limit switch 22 whereby the electric circuit controlled by stop dog 17 and operating limit switch 18 as shown in FIG. 2, is closed. Consequently, a predetermined advance of spindle 4 will cause stop dog 17 to close limit switch 18 which, in turn, will automatically halt advance of spindle 4.

Figure 6:
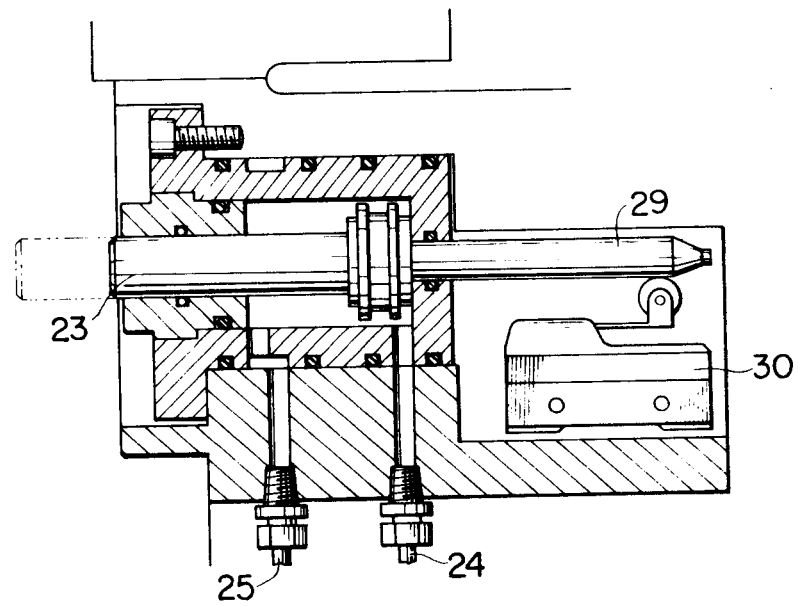
FIG. 6 is a view taken along the line VI—VI of FIG. 2.

FIG. 6 illustrates a piston 23 moving axially forwardly to the left as shown in FIG. 6, upon supply of a fluid under pressure from an inlet port 24, and the piston can be retracted when fluid is supplied thereto from an inlet port 25. Closing of limit switch 18, shown in FIG. 2, permits automatic supply of pressure fluid through inlet 24 of FIG. 6, so that piston 23 is automatically advanced axially, pushing a rod 26, shown in FIG. 2. In turn, rod 26 pivots a lever 28, pivoted on a pin 27 as a fulcrum, clockwise to retract finger 14 from internal gear 6.

It is only after disengagment of finger 14 from internal gear 6 that this gear can be rotated. An electric signal to permit such rotation can be provided by a limit switch 30 and a rod 29, at the rear end of piston 23, as shown in FIG. 6. The axial movement of piston 23 enables rod 29, at its rear end, to close limit switch 30. In this manner, spindle 4 is allowed to rotate with its rotating motion being eventually transmitted to spindle 3 of right-angled head 2.

The construction, as described above, has several advantages. Referring to FIG. 2, the procedure for connection of right-angled head 2, with support 15, to the front face of headstock 1 will be explained with respect to the electric and hydraulic mechanisms. When the attachment has been held in contact with the front face of the headstock, the confirming means of FIG. 5 closes an electric circuit that functions only while attachment 2 is mounted on headstock 1. As spindle 4 is caused to advance through a predetermined stroke, gear clutch member 5 and internal gear 6 are positively meshed due to the complete agreement between their respective tooth phases. Simultaneously, with the completion of the meshing of the gears or the engagement of the dog clutch, axial advance of spindle 4 is stopped automatically by the combination of stop dog 17 and limit switch 18. This automatic stopping of the axial advance of spindle 4, in turn, actuates the hydraulic piston mechanism of FIG. 6, with the result that latching finger 14 is retracted from internal gear 6 by rod 26 and bent lever 28.

An electric signal provided by operation of limit switch 30 of FIG. 6 enables spindle 4 to rotate, and rotation of spindle 4 is transmitted to spindle 3 of head 2 to permit the head to operate as such. In the manner described, the connection of an attachment to the headstock of a horizontal boring machine is accomplished automatically and positively. The present invention thus provides a device which is useful not only on ordinary horizontal boring machines, but which is also applicable for the first time to machines of large size and to numerically-controlled types, which do not warrant manual mounting of attachments thereon.

Figure 7:
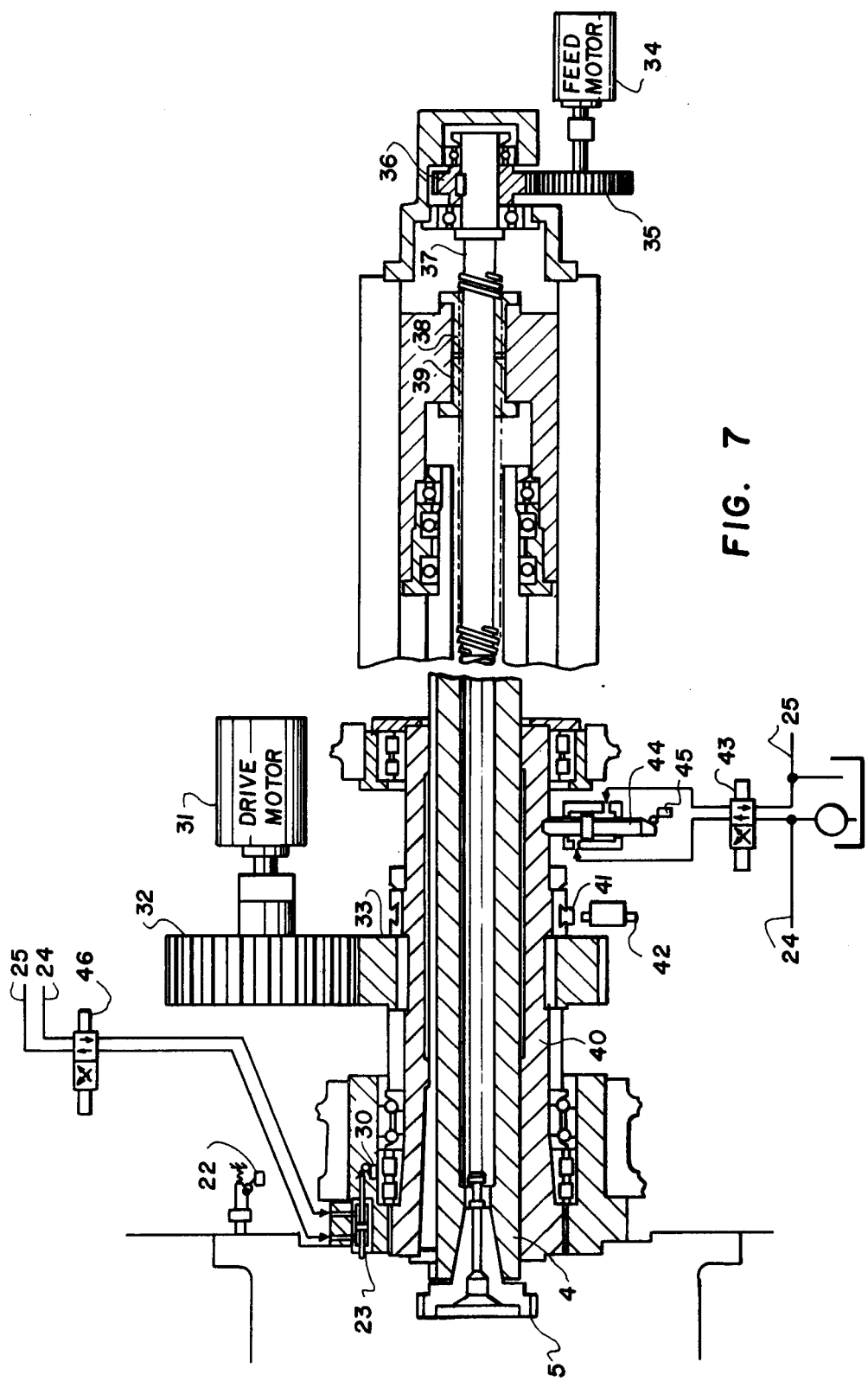
FIG. 7 is a view, similar to FIG. 2, of a known boring machine equipped with a mechanism for stopping motion of the headstock spindle always in a predetermined angular position and further equipped with the device of the invention for operably coupling an attachment to the boring machine.

In the known boring machine, equipped with the mechanism for stopping motion of the headstock spindle always in a predetermined angular position, as shown in FIG. 7, and which machine is further equipped with the invention arrangement for operatively coupling an attachment to the boring machine, certain relays and electrical connections have been omitted for the sake of clarity in the drawing. Referring to FIG. 7, headstock spindle 4 is axially slidable in a milling spindle 40, while being keyed to rotate with the latter, so that spindle 4 can be rotated by a driving motor 31 through the medium of gears 32 and 33.

Spindle 4 also can be reciprocated axially through engagement of nuts 38 and 39 with a lead screw 37 rotated by a feed motor 34 through the medium of gears 35 and 36. In order that the respective tooth faces of gear clutch member 5, secured to rotate the spindle 4, an internal gear 6, an attachment 2 and secured to rotate with spindle 3 of attachment 2, spindle 4 must be halted or stopped at a predetermined angular position.

For this purpose, there is provided, on milling spindle 40, a dog 41 which, when passing by a stationary sensor 42, causes the latter to generate an electric signal which is effective on driving motor 31 to stop this motor. Thereafter, a solenoid valve 43 is actuated to supply oil under pressure to a servo-motor whose piston brings a plunger 44 into engagement with a recess formed at a predetermined angular location on milling spindle 40. Plunger 44, responsive to this movement, actuates a limit switch 45, which provides an electric signal effective to energize feed motor 34 which causes spindle 4 to reciprocate axially.

As shown in FIG. 2, a stop dog 17 is provided on spindle 4 and, upon engagement of clutch member 5 with internal gear 6, actuates a stationary limit switch 18 which then effects the energization of feed motor 34. Limit switch 18 also changes over solenoid valve 46 which supplies oil under pressure to a servo-motor whose piston 23 operates member 26 to retract latch finger 14 from internal gear 6. At the same time, piston 23 actuates a limit switch 30 which changes over solenoid valve 43 to actuate the servo-motor to withdraw plunger 44 from engagement with milling spindle 40 and to energize driving motor 31, so that motor 31 can rotate spindle 4.

These sequential operations of the components complete the coupling of the attachment to the horizontal boring machine, and disconnection of the attachment from the boring machine as carried out in the reverse sequence. Additionally, limit switch 22 serves to confirm physical engagement of attachment 2 with boring machine 1.

While a specific embodiment of the invention has been shown and described in detail to illustrate the application of the principles of the invention, it will be understood that the invention may be embodied otherwise without departing from such principles.

What is claimed is:

1. In a horizontal boring machine comprising a headstock formed with a tool head mounting face and rotatably supporting an axially reciprocal headstock spindle, means for always stopping said headstock spindle in the same predetermined angular position, a first toothed clutch member on the free end of said headstock spindle and rotatable therewith, a tool head attachment having tool driving means and being releasably coupled to the mounting face of said headstock, a second toothed clutch member rotatably supported in said attachment and positioned to be axially alignable with said first toothed clutch member, releasable means being operable to retain said second clutch member in a predetermined angular position in which its teeth are in correct meshing alignment with the teeth of said first clutch member, said releasable means being responsive to securement of said tool head attachment to said headstock, and interengageable means associated with said tool head attachment and said headstock and being operable to retract said releasable means to release said second clutch member, whereby the teeth of said clutch members will have a smooth interengagement upon axial advance of the headstock spindle.

2. A device, as claimed in claim 1, in which said releasable means comprises a spring biased finger reciprocably mounted in said attachment and engageable with a notch in the external periphery of said second clutch member.

3. A device, as claimed in claim 2, in which said interengaging means includes a lever pivotally mounted intermediate its ends in said tool head attachment and having one end articulated to said finger; and a fluid pressure actuator on said headstock inluding a member engageable with the opposite end of said lever to pivot said lever to retract said finger from engagement with said notch.

4. A device as claimed in claim 3, in which said fluid pressure actuator comprises a cylinder, a piston reciprocable in said cylinder, and a piston rod secured to said piston and engageable with said other end of said lever; fluid pressure supply ports effective on opposite surfaces of said piston; a rod extending rearwardly from said piston; and a switch operated by said rod responsive to pivoting of said lever by said piston rod.

* * * * *